United States Patent [19]

Mayer

[11] Patent Number: 4,822,485
[45] Date of Patent: Apr. 18, 1989

[54] RECIRCULATING SAND FILTER VALVE

[76] Inventor: Robert B. Mayer, 9029 Longstreet Dr., Manassas, Va. 22110

[21] Appl. No.: 226,201

[22] Filed: Jul. 29, 1988

Related U.S. Application Data

[62] Division of Ser. No. 85,171, Aug. 14, 1987.

[51] Int. Cl.$^4$ ............................................. B01D 35/00
[52] U.S. Cl. ..................................... 210/123; 137/118; 210/151
[58] Field of Search .............. 137/118, 121, 122, 433; 210/86, 121, 123, 138, 151, 170, 195.1, 196, 197, 254, 284, 288, 290

[56] References Cited

U.S. PATENT DOCUMENTS

| | | | |
|---|---|---|---|
| 2,604,110 | 7/1952 | Gilder | 137/118 |
| 2,807,275 | 9/1957 | Steidley | 137/122 |
| 3,496,261 | 2/1970 | Parr | 137/118 |
| 3,679,053 | 7/1972 | Koulovatos et al. | 210/138 X |
| 3,804,253 | 4/1974 | Wellman et al. | 210/138 X |
| 4,005,726 | 2/1977 | Fowler | 137/119 |
| 4,011,162 | 3/1977 | Oldham et al. | 210/121 |
| 4,120,331 | 10/1978 | Kvivanek | 137/433 X |

Primary Examiner—Charles Hart
Attorney, Agent, or Firm—C. Lamont Whitham; Michael E. Whitham

[57] ABSTRACT

A recirculating sand filter system for the treatment of waste water comprises a septic tank (10) for receiving waste water, a recirculating pump tank (18) connected to the septic tank for receiving effluent from the septic tank and one or more sand filter modules (12, 14). The recirculating pump tank has a pump (48) connected to a pump outlet line (32) connected to the sand filter modules. A distribution pipe (28) connected to the pump outlet line is positioned to spray water over a surface of the sand filters. The pump is controlled by a timer (74) to periodically pump water to dose the sand filters. The sand filters have one or more collection pipes (34, 36) at the bottom of the filter for collecting filtrate and returning the filtrate to the recirculating pump tank via a return line (42) by gravity feed. A recirculating valve (52) in the recirculating pump tank is connected between the return line and a discharge line exiting the recirculating pump tank. The recirculating valve comprises a T-pipe (54) consisting of a horizontal straight section and a downwardly directed branching arm (66) having a large radius curvature allowing for smooth, nonturbulent flow. A float valve is connected to the branching arm for blocking the flow of water into the recirculating pump tank when a level of water in the tank exceeds a predetermined maximum level.

2 Claims, 4 Drawing Sheets

RECIRCULATING SAND FILTER VALVE

This is a divisional of co-pending application Ser. No. 085,171 filed on Aug. 14, 1987.

BACKGROUND OF THE INVENTION

1. Field of the Invention

The present invention generally relates to wastewater septic systems and, more particularly, to a valve structure used in a recirculating sand filter system having particular application in residential and small commercial installations.

2. Background of the Invention

Recirculating sand filters for waste water septic systems are used where drainage fields are inadequate or not practical. Waste water flows to a septic tank which provides initial treatment of the wastewater. The septic effluent is discharged into a recirculating pump tank which is provided with a pump controlled by a timer to periodically dose a recirculating sand filter. After the effluent is distributed over the sand filter, the filtrate is collected and directed back through the recirculating pump tank where a recirculation valve either returns it to the pump tank or discharges the effluent for final treatment and disposal. Typically, the effluent that is discharged is chlorinated before final discharge.

In the past, due to the complexity and cost of recirculating sand filter water treatment systems, such systems have been primarily limited to medium to large commercial applications. There is, however, a need for water treatment systems of this type for smaller commercial or residential applications wherein the usual drainage field is inadequate or not pracitcal.

U.S. Pat. Nos. 3,789,986, 3,957,642 and 4,011,162 to Oldham et al. disclose a treatment system for finishing sewage effluent generated from private dwellings. Incoming effluent is dumped onto a tray containing sand. The effluent is filtered by the sand and then drops into a reservoir through holes in the tray. A pump in the bottom of the reservoir pumps the fluid up to a sprayer which sprays the effluent down onto the sand filter for refiltering. A float controls the angle of a trough which extends partially under the sprayer. When the liquid level in the reservoir exceeds a predetermined limit, the trough is pivoted such that part of the spray from the sprayer is directed to an outlet pipe.

U.S. Pat. No. 3,717,251 to Hampton discloses an apparatus for filtering solids such as sewage. A float valve, rigidly connected to an arm member, is used to control a wash pump. The wash pump is shut off as a result of the float rising with the liquid level in the tank. The float actuates electrical contacts.

U.S. Pat. No. 3,202,174 to Rudelick discloses a float actuated fill valve. The valve prevents the liquid in a vessel from falling below a predetermined minimum level as well as preventing the liquid in the vessel from exceeding a predetermined maximum level. The valve comprises a free floating ball and a tubular member. The ball mates with valve seats at either end of the tubular member.

U.S. Pat. No. 2,944,669 to Schaaf discloses an effluent regulator for septic tanks. The regulator is bottle shaped and rises with the level of the sewage in the tank. U.S. Pat. No. 1,536,063 to Bartlett discloses a liquid treatment apparatus which includes a ball float carried on an angular extension of a pipe.

U.S. Pat. Nos. 4,350,587 and 4,439,317 to Jarrell disclose "on location" sewage treatment systems. In Pat. No. 4,350,587, an accordian pleated sheet supports a bacteria culture which consumes waste matter that passes through the sheet. These sewage treatment systems employ ozone gas for disinfecting the liquid resulting from treated sewage. U.S. Pat. No. 4,196,082 to Salokangas et al. discloses a combination biological dry toilet and a biological waste water purifying plant in which a pump is used to pump "grey" water over a filter bed. In the Salokangas et al. system, treated water is absorbed in the soil.

U.S. Pat. No. 4,439,323 to Ball discloses a process for discharging septic tank filtered effluent. Waste water is filtered and discharged from a septic tank in predetermined increments.

SUMMARY OF THE INVENTION

It is therefore an object of this invention to provide an improved recirculating sand filter sewage treatment system which is less complex and and less expensive than prior filters making the new filter system economically feasible for small commercial and residential applications.

It is another more specific object of the invention to provide a recirculating sand filter valve structure which greatly simplifies the operation and decreases the cost of sand filter sewage treatment systems.

According to the invention, a recirculating sand filter system is provided which is self actuated by a large ball check valve. The large ball is contained in a float housing. The float housing comprises a large diameter cylinder with "keepers" in the bottom for retaining the ball and a top section which connects the cylinder to a T-pipe. The arrangement allows filtrate from the sand filters to pass straight through the valve to the discharge or to be recirculated depending on the level of water in the recirculating pump tank. The conventional T-pipe is characterized by a "long reach" which provides good operating results, allowing more liquid to be returned to the tank by decreasing turbulence that would be experienced if a T-pipe were used. The top section of the float housing includes a rubber valve seat which mates with the ball float when the recirculating pump tank is full. Effluent is discharged until the level in the recirculating pump tank has lowered.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
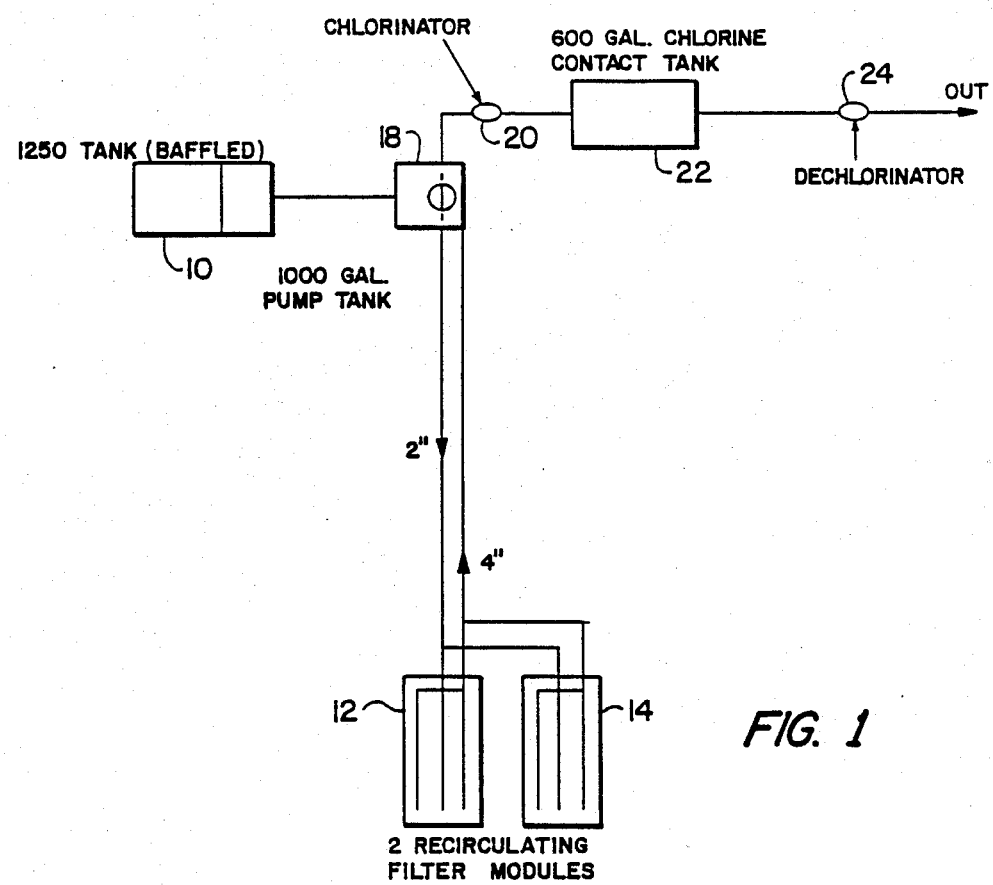
FIG. 1 is a plan schematic view of a recirculating sand filter which advantageously uses the recirculating sand filter valve according to the invention.

Referring now to the drawings, and more particularly to FIG. 1, the recirculating sand filter system comprises a septic tank 10 and typically two recirculating sand filter modules 12 and 14. Waste water flows from a house (not shown), for example, to the septic tank 10. For a four bedroom house, a two compartment 1250 gallon septic tank is provided. The first compartment is two thirds of the overall capacity of the tank. This tank configuration is provided to enhance the initial treatment of the waste water.

The septic effluent is discharged into a recirculating pump tank 18 which is provided with a pump controlled by a timer to periodically dose the sand filter modules 12 and 14. The pump tank and the pump are described in more detail with respect to FIGS. 3, 4 and 5. The recirculation rate is adjustable to allow matching of the recirculation rate to the total effluent volume. This allows the operator to achieve the best effluent quality at the lowest operating cost.

After the effluent is distributed over the sand filters 12 and 14, the filtrate is collected and directed back through the recirculating pump tank 18 where the recirculation valve either returns it to the pump tank or discharges the water for final disposal. When the effluent is discharged, it may be chlorinated with a tablet type chlorinator 20 with contact time being provided by a 450 gallon three compartment contact tank 22. If de-chlorination is required, a dechlorination tablet type dechlorinator 24 is used.

Figure 2A:
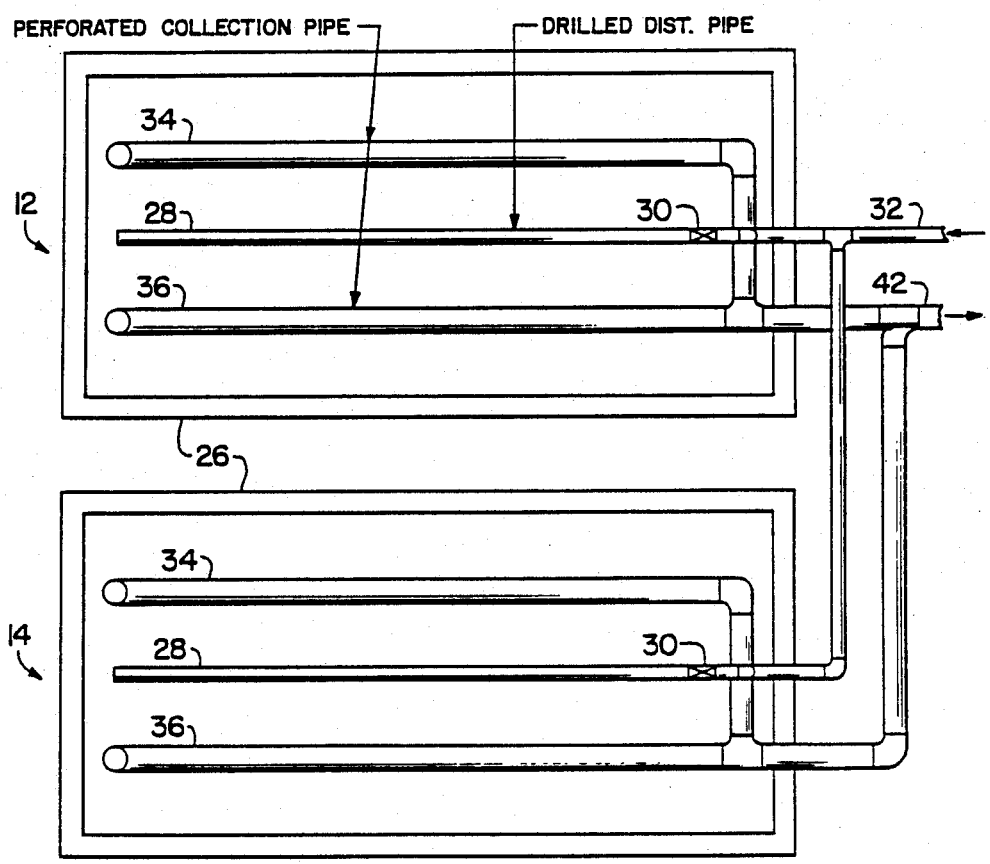
FIGS. 2A and 2B are top plan and side cross-sectional views, respectively of the sand filter modules used in the system shown in FIG. 1.
Figure 2B:
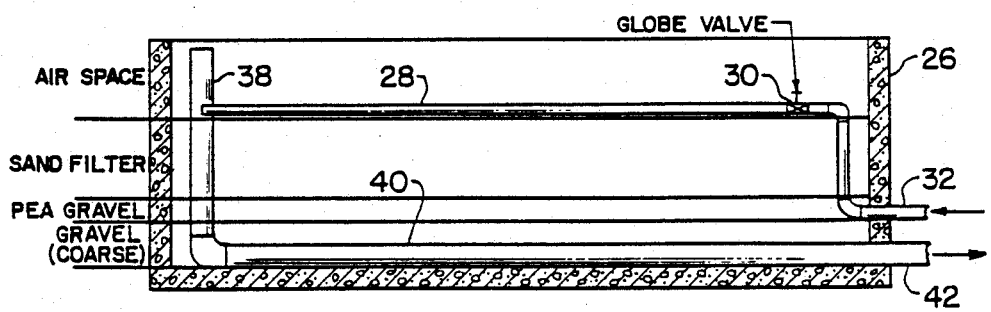

With reference to FIGS. 2A and 2B, the sand filter modules 12 and 14 each comprise a container 26 made of concrete, for example, of generally rectangular shape. For a 38" deep container, a 5" deep layer of coarse gravel is provided at the bottom of the container. This is covered with a 3" layer of pea gravel which is in turn covered by approximately 17" of sand. The space above the sand is air. A drilled distribution pipe 28 is connected via a globe valve 30 to the outlet pump line 32 from the recirculating pump in the pump tank 18. The distribution pipe 28 is positioned above the surface of the sand filter in the air space in the container 26. Effluent from the pump tank is thereby effectively sprayed over the top surface of the sand to dose the filter.

As the effluent passes through the sand filter, the filtrate is collected in one of two perforated collection pipes 34 and 36. These pipe have a solid vertical portion 38 which project into the air space above the sand and a perforated horizontal portion 40 which is buried in the layer of coarse gravel. The filtrate collected in the collection pipes 34 and 36 is returned by gravity to the recirculating pump tank 18 via return line 42.

Figure 3:
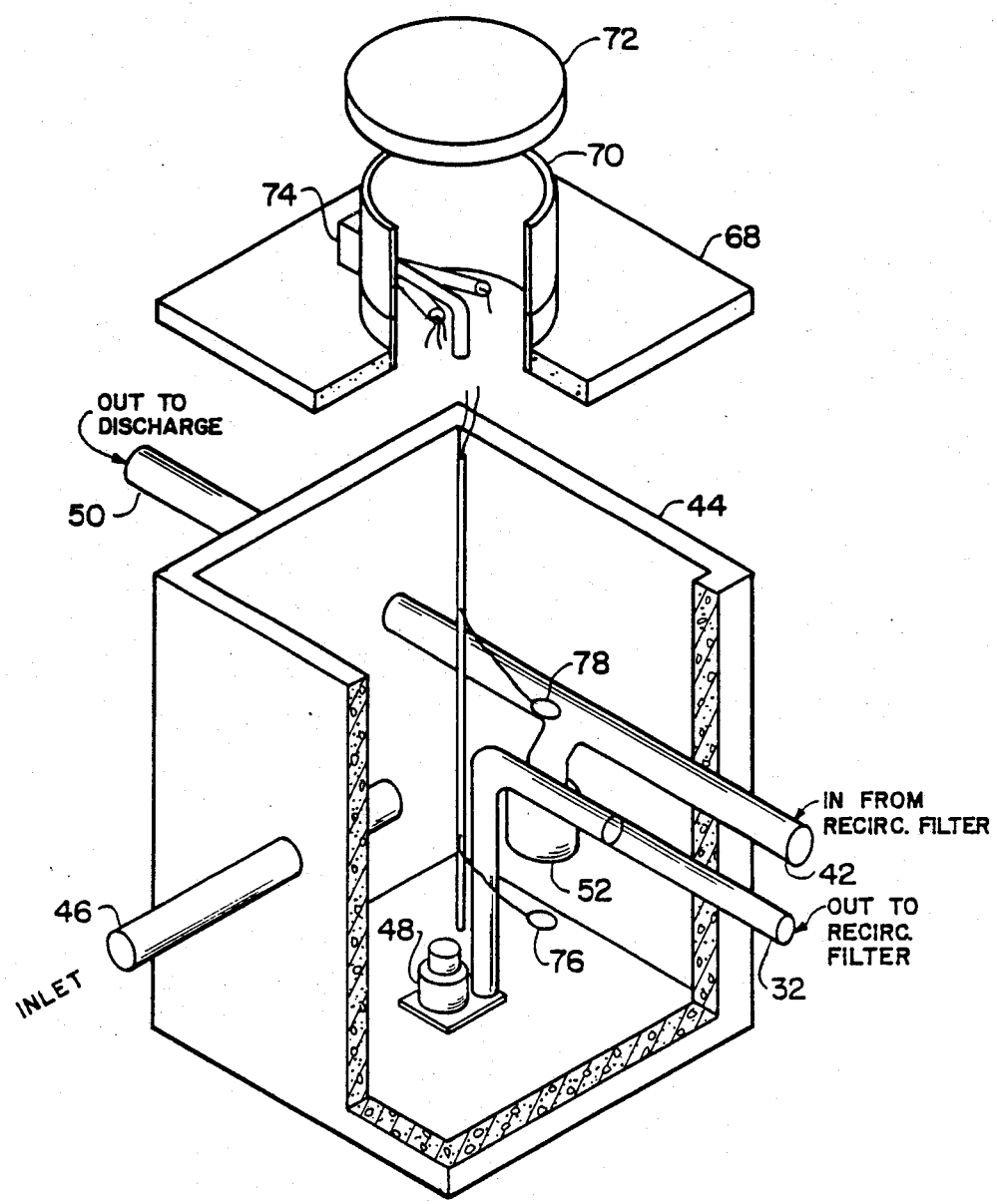
FIG. 3 is a partially broken away and partially exploded isometric view of the recirculating sand filter pump tank used in the system shown in FIG. 1 and incorporating the improved recirculating sand filter valve according to the invention.

The recirculating pump tank 18 is shown in more detail in FIG. 3 and comprises a 243 gallon storage tank 44 made of concrete, for example. An inlet pipe 46 is connected to the septic tank 10 for receiving effluent into the storage tank 44. A pump 48 is located in the bottom of the tank 44 and connected to the outlet pump line 32 that connects to the distribution pipes in the sand filter modules 12 and 14. The return line 42 from the sand filter modules 12 and 14 passes through the storage tank 44 and becomes the discharge line 50 that connects to the chloronater 20 or other post treatment device. Within the tank 44 is a recirculating valve 52 which is connected at the junction of the return line 42 and the discharge line 50.

Figure 4:
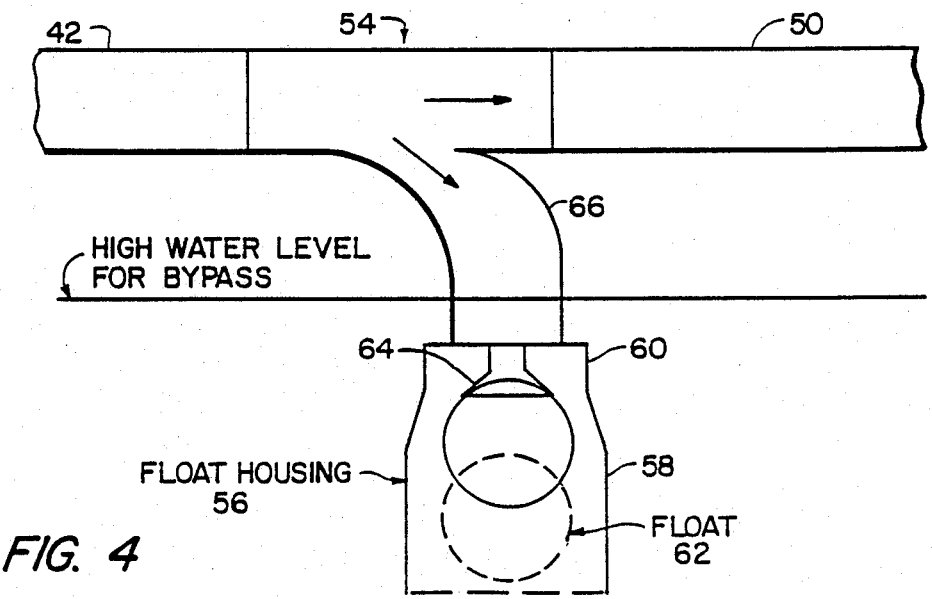
FIG. 4 is a side view showing the major components of the improved recirculating sand filter valve according to the invention.
Figure 5:
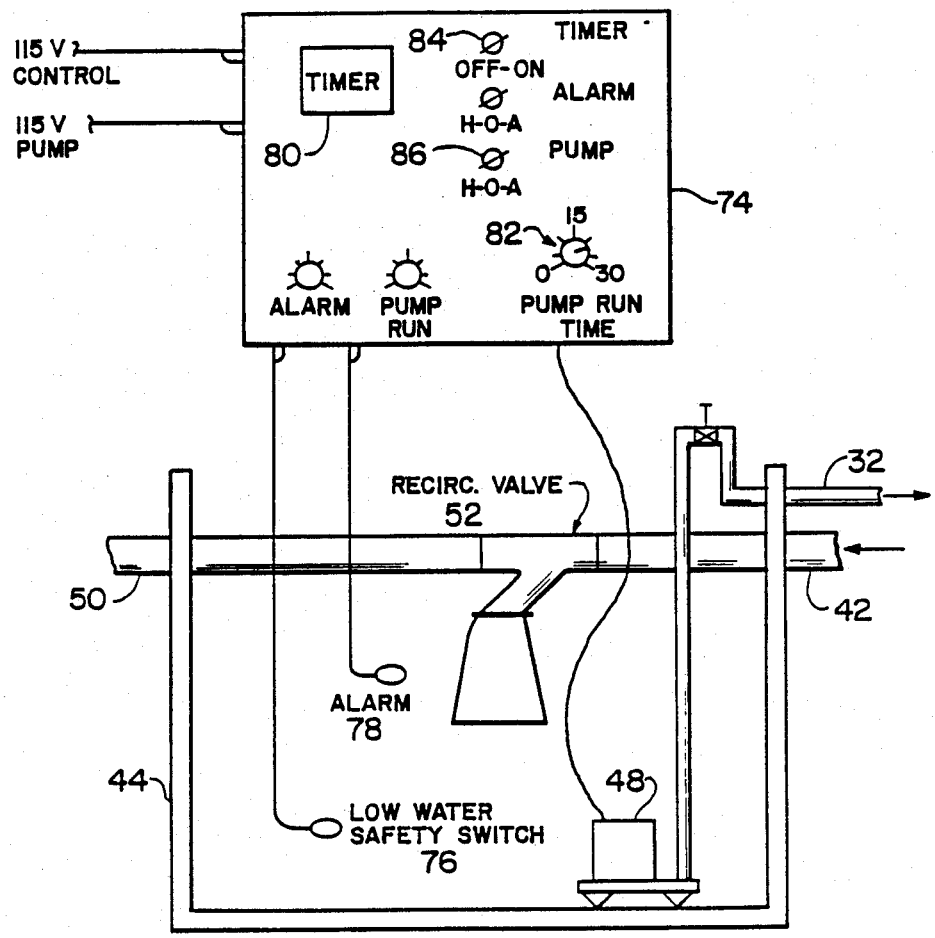
FIG. 5 is a block and schematic illustration of the recirculating sand filter pump tank and the control timer illustrating the operation of the system.

This valve is shown in more detail in FIG. 4 and comprises a T-pipe 54 connected to a float housing 56. The float housing 56 includes a large cylindrical lower section 58 and an upper section 60. The return line 42, discharge line 50, T-pipe 54, and float housing 56 may all be made of plastic, for example, such as polyvinylchloride (PVC), allowing for inexpensive and easy fabrication. A ball float 62 contained in the lower section 58 cooperates with a valve seat 64 in the upper section 60 to block the flow of effluent from return line 42 from entering the tank 44 when the water level in the tank 44 rises above a predetermined level. When this occurs, the effluent in return line 42 is directed to discharge line 50.

The T-pipe 54 is characterized by having a long reach of arm 66; that is, the arm diverts from the main, straight pipe section in a large radius curve. It is this design that makes the recirculating valve operable in the desired manner. Specifically, the smooth large radius curve of arm 66 allows the flow of effluent from the return line 42 to flow smoothly without turbulence either into tank 44, when the ball float 62 does not engage the valve seat 64, or directly on through discharge line 50, when the ball float 62 engages the valve seat 64.

Returning to FIG. 3, the tank 44 is provided with a cover 68 having an access 70 with a lid 72. On top of the cover 68 adjacent to the access 70 is timer and alarm control 74 which is connected to the pump 48 and a low water safety switch 76 and an alarm switch 78. The connections are shown in more detail in FIG. 5 where the timer and alarm control 74 is connected to a source of 115 VAC to both operate the timer and supply power to the pump 48. The low water safety switch 76 is normally in the up position to assure enough water is in the tank 44 to dose the filter modules 12 and 14. A 24-hour, 7-day timer 80 is programmed to initiate a single pump run time operation in 15 minute increments, usually every 45 minutes or one hour. The pump 48 runs as set by the pump run time dial 82. For the pump to be automatically actuated, the timer switch 84 must be on and the pump switch 86 must be on "auto". The pump may also be operated in the "manual" position.

The pump is sized to dose the recirculating sand filter modules 12 and 14 as prescribed in design criteria for a specific application. In the event that the tank 44 is full when effluent is recirculated from the sand filter modules, the recirculation valve 52 prevents the filtrate from re-entering the pump chamber. This bypass contiues until enough waste water is discharged from the sand filters and the pump lowers the water level in the chamber to allow the recirculating waste water to re-enter. In the event of pump failure, the water will continue to rise in the pump chamber and the alarm switch 78 will be actuated causing an alarm to sound and continue to run. The alarm will also sound when excessive waste water enters the pump chamber between doses. However, the next pump cycle should eliminate the alarm. Thus, an intermittant alarm indicates excessive water use or a leak.

While the invention has been described in terms of single preferred embodiment for a residential application and the best mode is illustrated by way of specific dimensions and materials, those skilled in the art will appreciate that the invention may be practiced with modification and variation in both dimensions and materials without departing from the spirit and scope of the appended claims.

Having thus described my invention what I claim as novel and desire to secure by Letters Patent is as follows:

1. A recirculating valve for use in a recirculating sand filter system, said recirculating valve being adapted to being located in a recirculating pump tank connected between a return line entering said recirculating pump tank and a discharge line exiting said recirculating pump tank, said recirculating valve comprising:

a T-pipe consisting of a horizontal straight section and a downwardly directed branching arm having a large radius curvature allowing for smooth, non-turbulent flow of water into either said recirculating pump tank of water discharge line; and a float valve connected to said branching arm for blocking the flow of water into said recirculating pump tank when a level of water in the tank exceeds a predetermined maximum level thereby diverting water into said discharge line.

2. The recirculating sand filter system as recited in claim 1 wherein said recirculating valve is made of plastic and said float valve comprises a float housing comprising a large cylindrical lower portion containing a ball and a smaller upper portion containing a valve seat positioned vertically above said ball and cooperating with said ball to block the flow of water from said return line into said recirculating pump tank and instead diverting said flow of water to said discharge line.

* * * * *